United States Patent [19]
Gibson

[11] Patent Number: 5,337,602
[45] Date of Patent: Aug. 16, 1994

[54] PITOT STATIC TUBE HAVING ACCESSIBLE HEATING ELEMENT

[76] Inventor: Michael E. Gibson, 6 Tall Pines La., Nesconset, N.Y. 11767

[21] Appl. No.: 934,727

[22] Filed: Aug. 24, 1992

[51] Int. Cl.$^5$ .............................. G01C 21/00
[52] U.S. Cl. ........................... 73/182; 73/861.68
[58] Field of Search .................. 73/182, 180, 861.68, 73/861.65, 861.66, 861.67

[56] References Cited

U.S. PATENT DOCUMENTS

| | | |
|---|---|---|
| 1,971,534 | 8/1934 | Peace, Jr. . |
| 2,221,547 | 11/1940 | Kollsman . |
| 2,254,155 | 8/1941 | Reichel . |
| 2,283,045 | 5/1942 | Carbonara . |
| 2,300,654 | 11/1942 | Daiber . |
| 2,306,684 | 12/1942 | Carbonara . |
| 2,370,102 | 2/1945 | Woodman . |
| 2,381,327 | 8/1945 | Woodman et al. . |
| 2,393,593 | 1/1946 | Daiber . |
| 2,399,370 | 4/1946 | McOrally . |
| 2,404,978 | 7/1946 | Morton . |
| 2,428,542 | 10/1947 | Bernhardt . |
| 2,482,701 | 9/1949 | Anderson . |
| 2,510,986 | 6/1950 | Larkin . |
| 2,697,349 | 12/1954 | Larkin ........................... 73/861.78 |
| 3,030,807 | 4/1962 | Scadron . |
| 3,097,528 | 7/1963 | Mohring . |
| 3,163,040 | 12/1964 | Werner . |
| 3,267,992 | 8/1966 | Werner et al. . |
| 3,364,742 | 1/1968 | De Leo . |
| 3,383,916 | 5/1968 | Werner . |
| 3,400,583 | 9/1968 | Newport et al. . |
| 3,443,058 | 5/1969 | Johnston . |
| 3,482,445 | 12/1969 | De Leo et al. . |
| 3,488,470 | 1/1970 | Weaver . |
| 3,514,999 | 6/1970 | Mejean et al. . |
| 3,535,930 | 10/1970 | Rees . |
| 4,000,647 | 1/1977 | Tauchmann . |
| 4,121,088 | 10/1978 | Doremus et al. . |
| 4,275,603 | 6/1981 | Kalocsay . |
| 4,458,137 | 7/1984 | Kirkpatrick . |
| 5,025,661 | 6/1991 | McCormack . |
| 5,026,001 | 6/1991 | Wright et al. . |
| 5,043,558 | 8/1991 | Byles . |
| 5,046,360 | 9/1991 | Hedberg . |

*Primary Examiner*—Richard E. Chilcot, Jr.
*Assistant Examiner*—Joseph L. Felber
*Attorney, Agent, or Firm*—Dilworth & Barrese

[57] ABSTRACT

A repairable pitot static tube which provides for replacement of the internal heating elements and other components parts. The heating elements may be accessed from either end of the barrel portion of the pitot static tube and repairs may be done either with the pitot static tube in place on an aircraft or removed from the aircraft. The end cap of the barrel portion is also made removable to provide access to the heater from both ends as well as to replace defective end caps to salvage damaged pitot static tubes.

21 Claims, 9 Drawing Sheets

PITOT STATIC TUBE HAVING ACCESSIBLE HEATING ELEMENT

BACKGROUND OF THE INVENTION

1. Field of the Invention

The present invention relates to pitot static tubes, and more particularly, to a repairable pitot static tube which may be disassembled to repair or replace component parts.

2. Discussion of the Prior Art

Pitot static tubes are used on aircraft for measuring certain parameters such as air speed. The pitot static tube extends from the body of the aircraft such as from the fuselage or the wing, and measures the difference between pitot pressure and static pressure to provide an indication of the speed of the aircraft. Pitot static tubes usually include a heating element to melt off any ice that may form on the tube or which would clog the flow openings on the tube during flight.

Typically, a pitot static tube has a mounting plate from which a body portion extends at an angle and terminates in a barrel which is generally parallel to the body or wing of the aircraft on which the pitot static tube is mounted. In the past, many pitot static tubes were of unitary construction; that is, the body, mounting bracket and barrel were of single piece construction. In the event that the pitot static tube became damaged, or in the event of a burnout of the heating element, the entire pitot static tube had to be removed and discarded and replaced with an entirely new unit. This led to increased costs, since the entire pitot static tube had to be replaced regardless of whether the cause was due to a major problem or a minor malfunction.

There is known in the prior art several pitot static tubes which are partially repairable, specifically in which the barrel portion of the tube may be disassembled to remove a heating element in the barrel. Pitot static tubes of this type are shown in U.S. Pat. No. 1,971,534 to Peace, Jr., U.S. Pat. No. 2,254,155 to Reichel, and U.S. Pat. No. 2,482,701 to Anderson, and these devices provide access to the heater from one end of the barrel only. Peace, Jr. requires the use of special adapters and contact plates to create the electric circuit to provide power to the heater, while both Reichel and Anderson provide for removal of a coiled heater which requires special handling during insertion into the tube to connect the contact ends of the heating element at the end of the elongated arms of the heater.

Several pitot static tubes also include a heating element in the body portion of the pitot static tube which extends from the mounting plate to the barrel. Typically, this heating element is non-removable, since access to the heating element may only be gained through destruction of the body portion. While some attempts have been made to provide a removable heater in the body portion, such as in U.S. Pat. No. 4,275,603 to Kalocsay, heating elements of this type rely on indirect heating by maintaining contact with the outer body of the pitot static tube. Such a construction may lead to increased damage to the heater since it is positioned adjacent the external surface of the body of the pitot static tube, and further limits the heating capability of the heater since it is typically provided at only one point along the external surface of the body portion and will lose heat to the atmosphere.

The novel repairable pitot static tube of the present invention obviates the disadvantages encountered in the prior art and provides a means for repairing a pitot tube by allowing access to the heating mechanisms positioned inside both the barrel and the body of the pitot static tube. There is also provided a means for extending the length of the barrel as well as provisions for adding additional heaters to the extended barrel. The device of the present invention allows for repair of the pitot tube on-site and permits access to the heater in the barrel portion from either end of the barrel. In addition, the entire assembly is removable from the fuselage or wing of an aircraft so that the heating mechanism in the body portion may be removed for replacement if necessary.

SUMMARY OF THE INVENTION

The present invention provides a novel repairable pitot static tube for measuring various parameters associated with an aircraft during flight. The pitot static tube of the present invention allows for repair of the device by providing access to the heater in the barrel of the pitot static tube from either end of the tube as well as including provisions for extending the length of the barrel to include additional heaters if required. Furthermore, the heater in the body portion of the pitot static tube is accessible for replacement of that heater in the event it should malfunction. Finally, the end cap of the barrel is removable to provide access to the heater as well as for replacement of the end cap itself.

The pitot static tube of the present invention comprises a mounting plate for securing the device to the fuselage or wing of an aircraft, from which extends a body portion at an angle which includes at least one internal chamber. A barrel portion is secured to the body portion and extends at an angle from the body portion so as to be positioned substantially parallel to the fuselage or wing of the aircraft to which the pitot static tube is secured.

In one embodiment, the barrel portion comprises a main barrel, a closed end cap, and an open tip member which allows the air to flow into the pitot tube. The barrel portion is essentially tubular in construction although any geometric cross-section may be utilized, such as square, triangular, pentagonal etc.; preferably a tubular construction is used having a circular cross-section. The barrel portion includes a central passageway along its length. A main barrel heater is provided which is connected in a quick-connect fashion to a tip heater which is positioned in the central opening of the tip member. Both heaters include a central hollow core that allows the air to flow through the opening of the tip member and through the barrel, and ultimately into the body portion of the device. A conical end cap is provided to close off the rear end of the barrel, and is removable both for replacement of damaged end caps as well as to provide access to the barrel heater. The conical end cap includes a biasing means such as a spring which urges the barrel heater towards the tip heater to maintain the electrical connection therebetween.

The body portion has a generally elliptical cross-section and preferably includes at least one partition member to separate the internal chamber into two parts. In a first part there is positioned a tubular heating element, typically known as a "fire rod" which heats the body portion. The second chamber allows wires and sensing equipment to pass through to the barrel to provide for measurement of various parameters such as air speed. The fire rod heating element is accessible from the mounting plate and may be removed in the event of failure for replacement.

In another embodiment, the barrel includes a transition or extension member which is positioned between the barrel and the tip member. This allows for elongation of the barrel for a larger aircraft, and further includes a transition heating element which is positioned between the barrel heater and the tip heater and includes a central hollow core which is aligned with the hollow core of the barrel heater and tip heater.

Furthermore, in both embodiments, the internal chamber of the body portion which includes the fire rod heating element may include a heat conductive gel material to provide for even heating of the entire body portion.

BRIEF DESCRIPTION OF THE DRAWINGS

The foregoing features of the present invention will become more readily apparent and may be understood by referring to the following detailed description of an illustrative embodiment of the repairable pitot static tube, taken in conjunction with the accompanying drawings, in which.

DETAILED DESCRIPTION OF THE PREFERRED EMBODIMENTS

Figure 1:
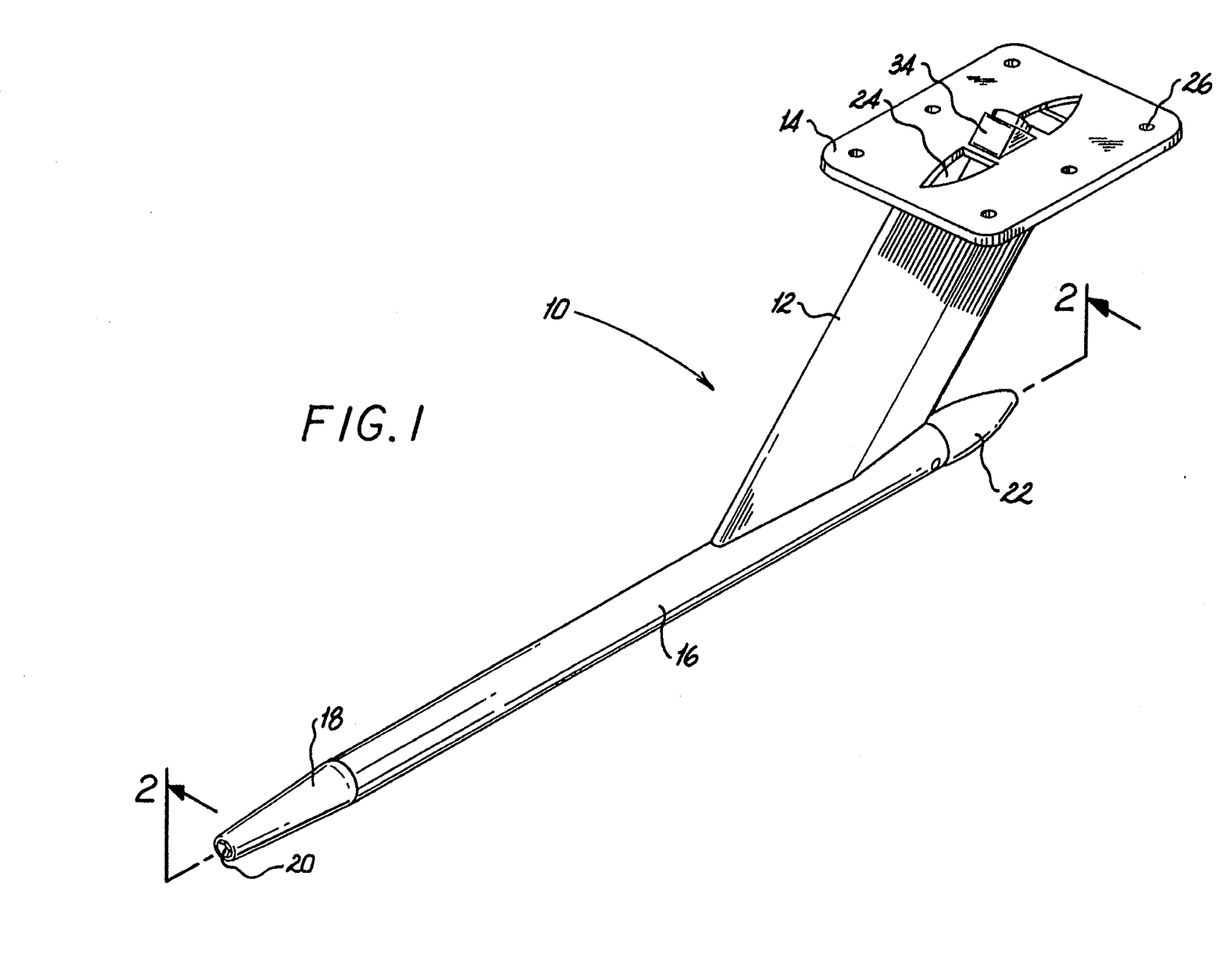
FIG. 1 illustrates a perspective view of a first embodiment of the repairable pitot tube of the present invention.

Referring now in specific detail to the drawings, in which like referenced numerals identify similar or identical elements throughout the several views, FIG. 1 shows the repairable pitot static tube of the present invention. Pitot static tube 10 includes a body portion 12 which extends from a mounting plate assembly 14 at an angle thereto. Body portion 12 extends to barrel portion 16 which is positioned at such an angle so as to be parallel to mounting plate assembly 14, and thus, the fuselage or wing of an aircraft to which mounting plate 14 is secured. Mounting plate 14 includes a plurality of openings 24 and is secured to the aircraft through mounting openings 26, which may accommodate screws, rivets, bolts, or the like.

Barrel portion 16 is secured to body portion 12 in a conventional manner, and terminates at one end in tip member 18 and at the other end in end cap member 22. Tip member 18 is provided with flow opening 20 which allows air to flow therethrough for measuring pitot pressure by the dynamic airflow through the channel located throughout barrel portion 16. Preferably, tip member 18 is threadably secured to barrel portion 16 so that tip member 18 may be removed to provide access to the interior of barrel portion 16. End cap 22 is removably secured to the end of barrel portion 16 opposite tip member 18. End cap 22 provides access to the interior of barrel portion 16 to aid in the removal and replacement of the barrel heater. In addition, end cap 22 is removable in order to replace the end cap in the event the end cap becomes damaged during use. A typical problem encountered with pitot static tubes is damage to the end cap member which is subjected to wind currents and pressures which may cause damage to the end cap and impair the performance of the pitot tube. Previously, a damaged end cap would require replacement of the entire pitot tube assembly, and the present invention provides a quick and efficient means for replacing the end cap to prolong the life of the pitot static tube.

Figures 2, 5:
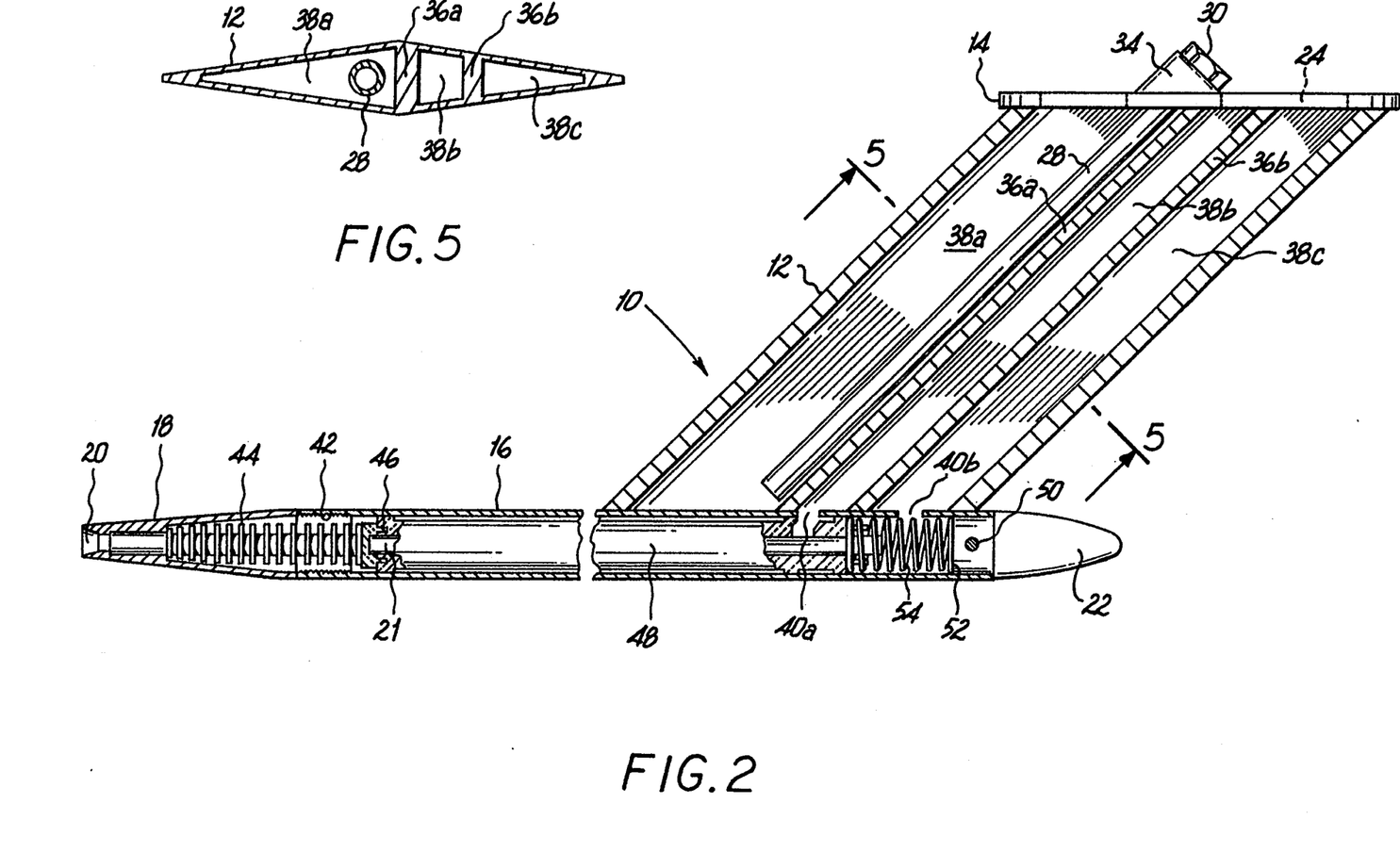
FIG. 2 illustrates a longitudinal cross-sectional view taken along lines 2—2 of FIG. 1.
FIG. 5 illustrates a cross-sectional view of the body portion taken along lines 5—5 of FIG. 2.

As seen in FIG. 2, body portion 12 is secured to mounting plate assembly 14 and includes at least one partition 36 to separate the interior of body portion 12 into chambers 38. Preferably, two partitions 36a and 36b are provided, thus separating the interior of body portion 12 into chambers 38a, 38b and 38c. FIG. 5 shows the positioning of fire rod heating element 28 in relation to partitions 36a and 36b.

Heating element 28 is secured to a shoulder member 34 through the provision of screw threads 32. (See FIG. 4c). Heating element 28 is tightened by rotating hex nut head 30 into shoulder 34. Preferably, internal chamber 38a includes a heat conductive gel material for distributing heat throughout body portion 12.

Barrel portion 16 extends from body portion 12 and includes barrel heater 48. Secured at one end of barrel portion 16 is tip member 18 having tip heater 44 positioned therein. Tip member 18 is secured to barrel portion 16 through connection threads 42 so that tip member 18 may be easily removed to service either heater 44 or heater 48.

Flow opening 20 in tip member 18 communicates with flow passage 21 which comprises the internal hollow core of heaters 44 and 48. Flow passage 21 communicates with chamber 38b through barrel opening 40a as shown. Barrel opening 40b communicates with chamber 38c to allow for electrical connection of the heaters to the main power controls of the aircraft.

Tip heater 44 is electrically connected to barrel heater 48 through heater connections 46, which are preferably of the quick-connect type. Barrel heater 48 is electrically connected the main controls of the aircraft through wires (not shown) which pass through barrel opening 40b and pass through chamber 38c.

End cap 22 is removably secured to barrel 16 either by screw threads or, as shown in FIG. 2, a set screw 50 to allow for quick removal. Cap 22 is provided with an abutment surface 52 against which rests spring member 54 which biases the heaters toward the tip member 18 to maintain the electrical connection at heater connections 46.

Figure 3A:
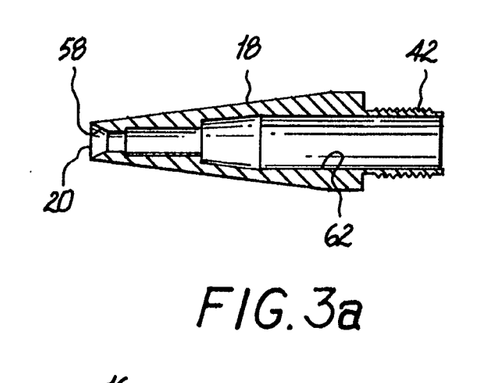
FIGS. 3a-3c illustrate the tip member, barrel component, and end cap, respectively, of the barrel portion of the pitot tube of the present invention.
Figure 3B:
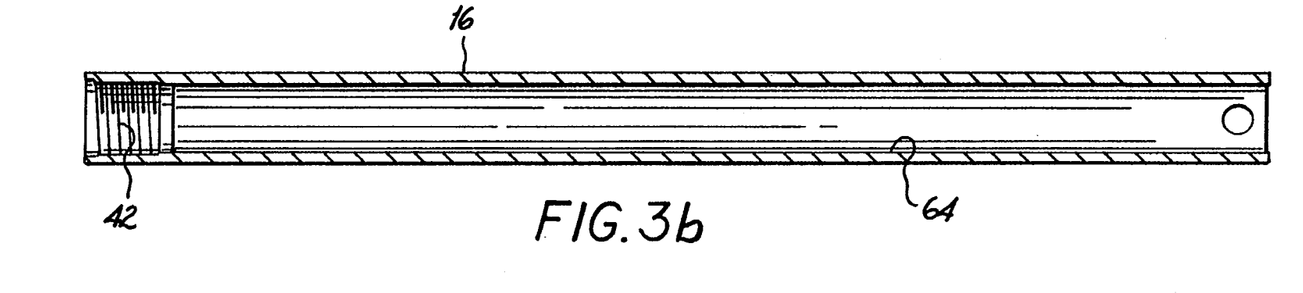
Figure 3C:
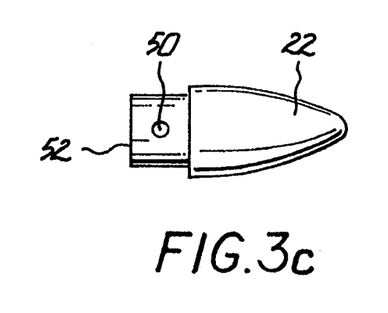

FIGS. 3a-3c show the components of the barrel portion. Tip member 18 includes connection threads 42 for securing a tip member to the barrel portion 16. Flow opening 20 includes tapered inlet 58 and heater chamber 62 which secures heater 44 therein. Barrel portion 16 includes heater chamber 64 for securing heater 48 therein. End cap member 22 includes abutment surface 52 against which spring member 54 rests.

Figure 4A:
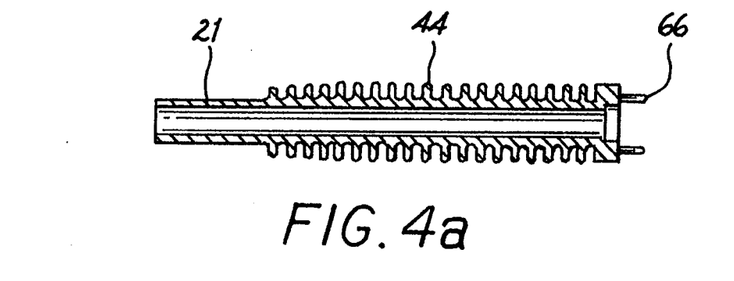
FIGS. 4a-4c illustrate the tip heater, barrel heater, and fire rod heater, respectively, of the pitot tube of FIG. 1.
Figure 4B:
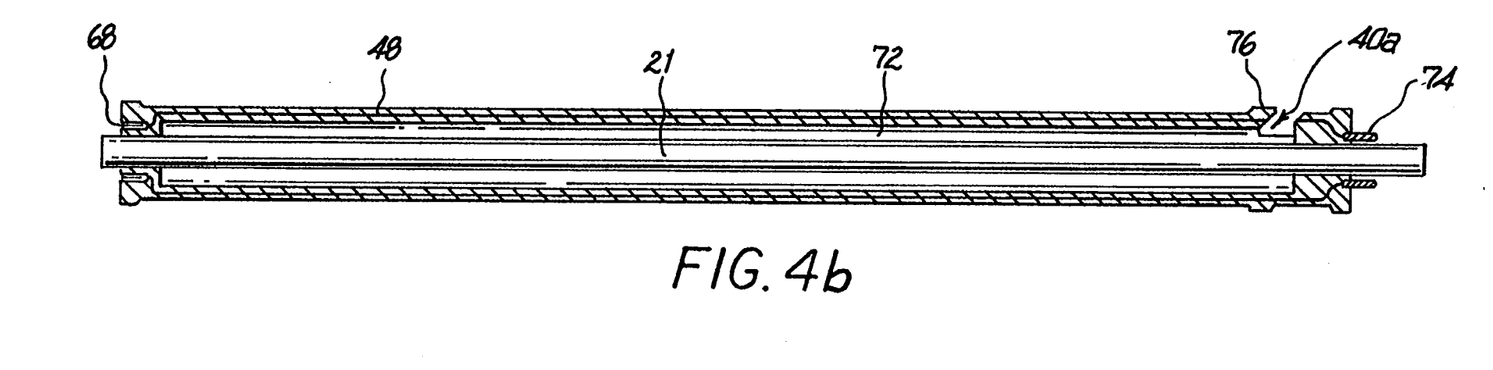
Figure 4C:
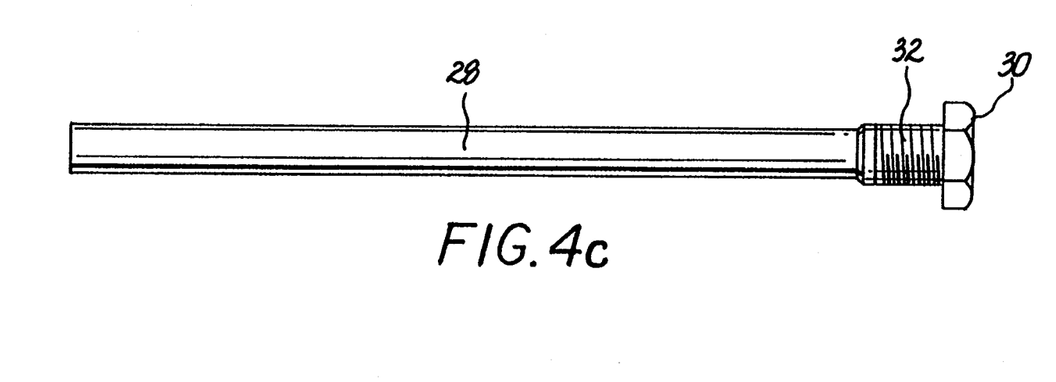

FIGS. 4a–4c show the heaters used in pitot static tube 10 of FIG. 1. Tip heater 44 includes flow passage 21 and terminates at connection pins 66. Connection pins 66 mate with connectors 68 of barrel heater 48. Barrel heater 48 further includes flow passage 21 which communicates with flow passage 21 of heater 44. Barrel heater 48 also includes air channel 72 which is opened at one end to communicate with static ports in barrel 16 and opens at a further end to communicate with chamber 38b through opening 40a. Barrel heater 48 terminates in pins 74 which are electrically connected through wires to the main electric circuit in the aircraft. Finally, barrel heater 48 may include the provision of fib members 76 to assist in properly aligning the heater within the barrel portion. FIG. 4c illustrates fire rod heating element 28 that is described above in connection with FIG. 2.

Figure 6:
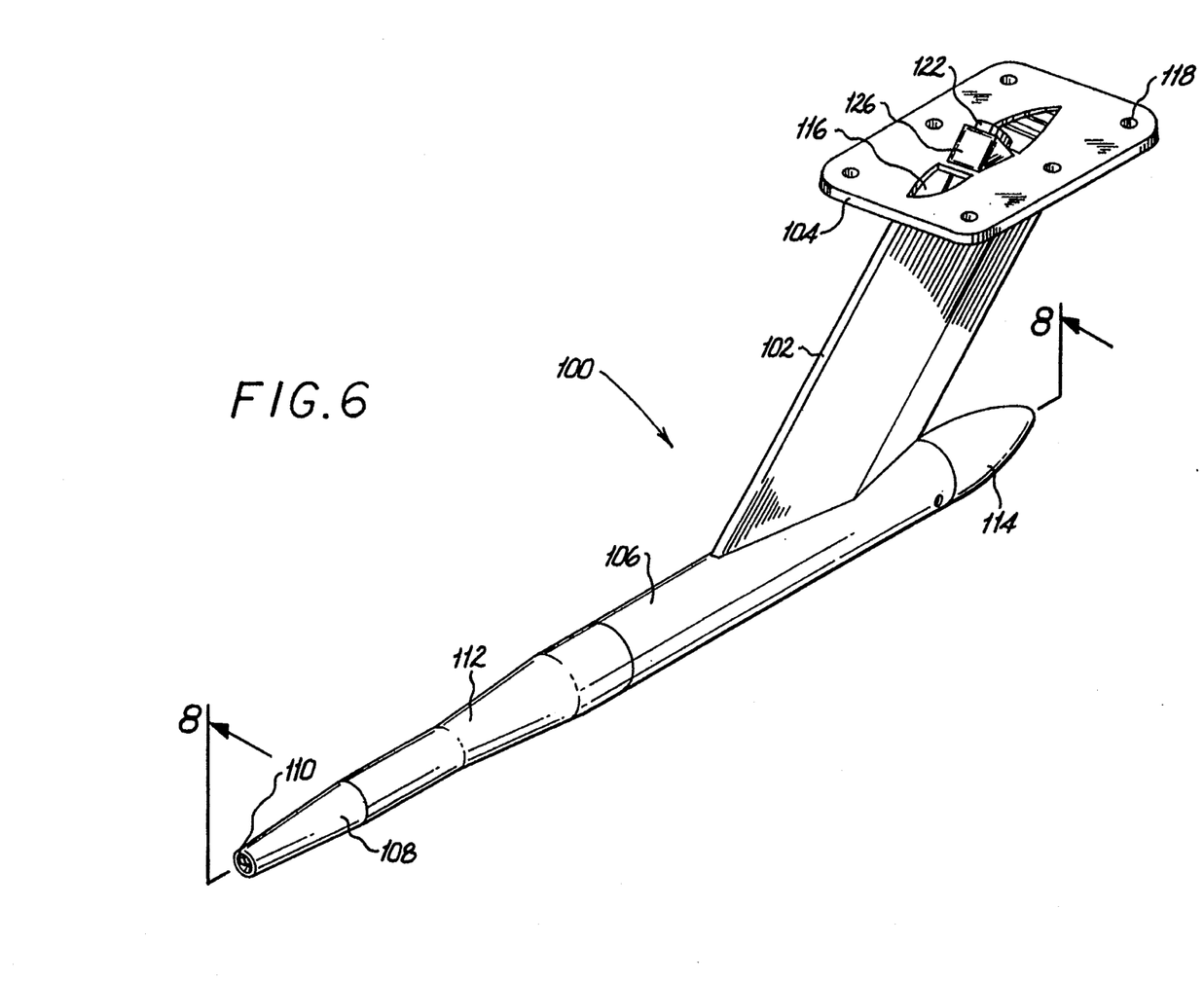
FIG. 6 illustrates a perspective view of a second embodiment of the pitot static tube of the present invention.
Figure 7:
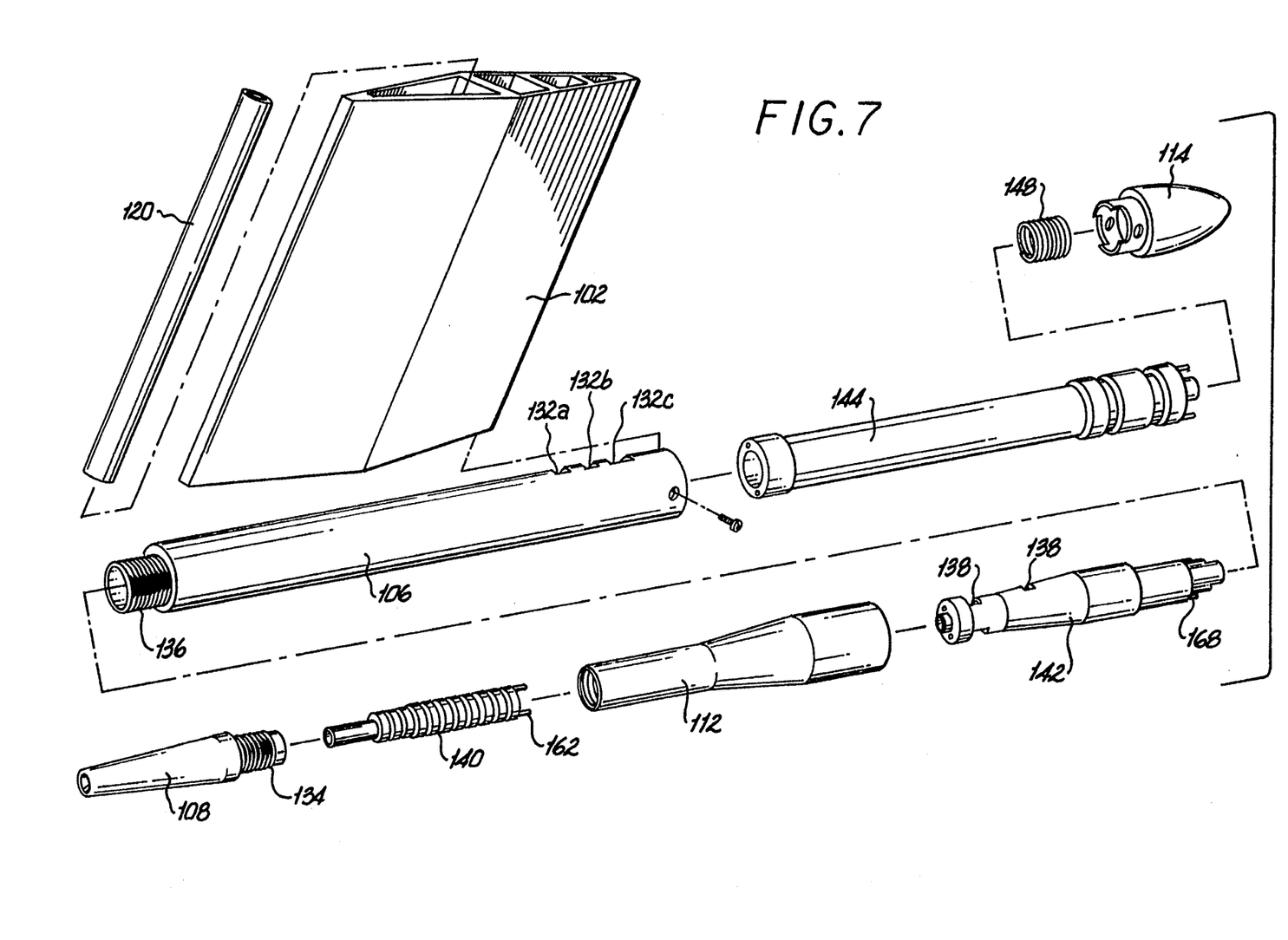
FIG. 7 illustrates an exploded perspective view of the pitot static tube of FIG. 6.

FIGS. 6 and 7 illustrate a second embodiment of the pitot static tube of the present invention. Pitot static tube 100 consists of body portion 102, mounting plate 104 and barrel portion 106. Barrel portion 106 is closed at one end by end cap 114 which is releasably secured to barrel portion 106, and at its other end by releasably secured tip member 108 and transition member 112. Tip member 108 is releasably secured to transition element 112 and is provided with flow opening 110 and to allow for the inflow of air.

Mounting plate 114 includes a plurality of openings 116 and is further provided with mounting holes 118 which accommodate screws, bolts, rivets or the like.

Figure 8:
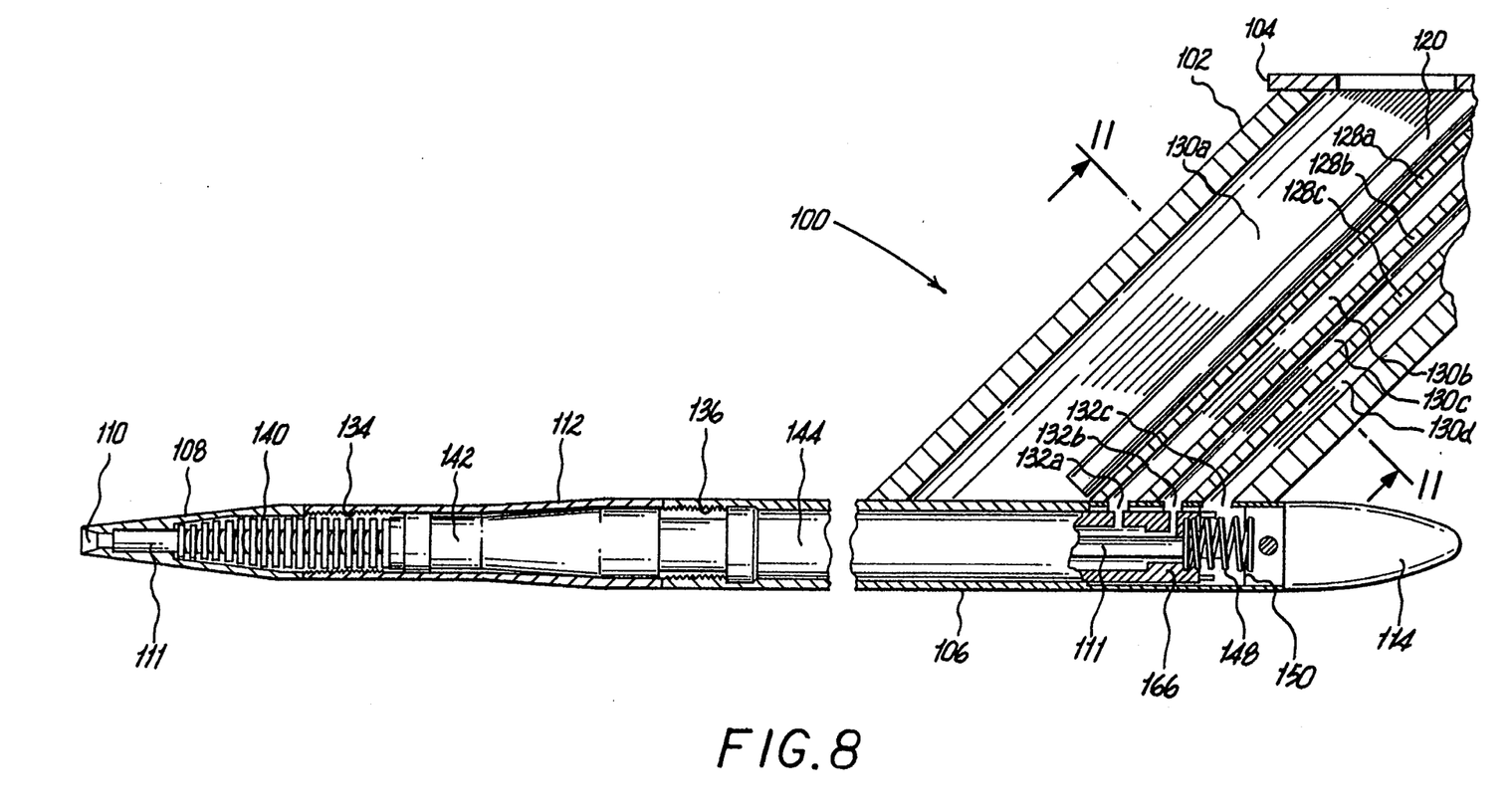
FIG. 8 illustrates a longitudinal cross-sectional view taken along lines 8—8 of FIG. 6.

As best seen in FIGS. 7 and 8, pitot static tube 100 is similar to pitot static tube 10 as described above, except for the provision of transition member 112 having transition heater 142 positioned therein. Barrel portion 106 includes barrel heater 144 which is joined to transition heater 142 through pins 168. Tip heater 140 is joined to transition heater 142 through pins 162. Flow passage 111 extends through tip heater 140, transition heater 142, and barrel heater 144 and communicates with chamber 130c through barrel opening 132b. Transition member 112 includes static ports 138 which communicate with air passages 166 to provide for static pressure measurement. Air passages 166 communicate with chamber 130b through barrel opening 132a.

Figure 11:
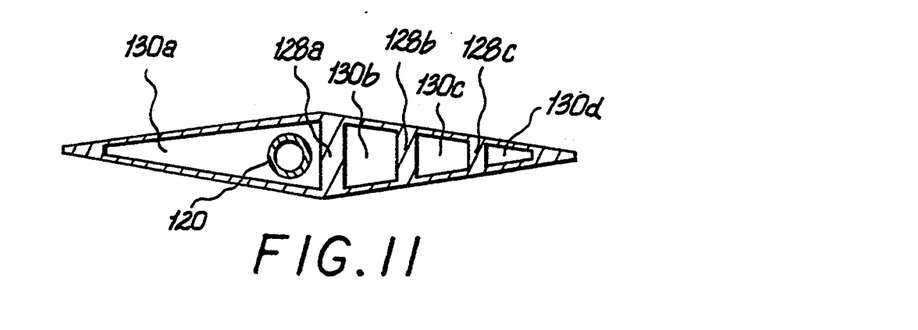
FIG. 11 illustrates a cross-sectional view of the body portion taken along lines 12—12 of FIG. 8.

Body portion 102 is similar to body portion 12 shown in FIG. 1 except for the provision of additional partitions as best seen in FIG. 11. Partitions 128a through 128c divide the internal chamber into chambers 130a through 130d. Chamber 130a houses fire rod heating element 120 and may include a heat conductive gel material (not shown). Chamber 130b communicates with static air passages 166 through barrel opening 132a. Chamber 130c communicates flow passage 111 through barrel opening 132b. Finally, chamber 130d is utilized for routing wires to electrically connect the heating element assembly to the circuitry of the aircraft through barrel opening 132c.

Fire rod heating element 120 is secured in place by mounting heating element 120 to shoulder 126 on mounting plate 104. Heating element 120 is rotatably tightened through the provision of hex nut head 122 which threadably secures the heating element 120 to shoulder 126.

Figure 9A:
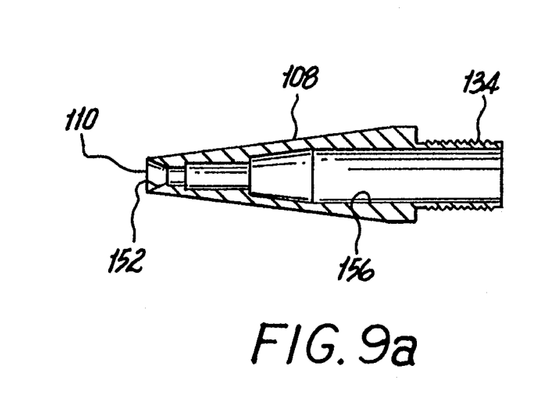
FIGS. 9a-9d illustrate the tip member, transition member, barrel component, component and end cap, respectively, of the pitot tube of FIG. 6.
Figure 9B:
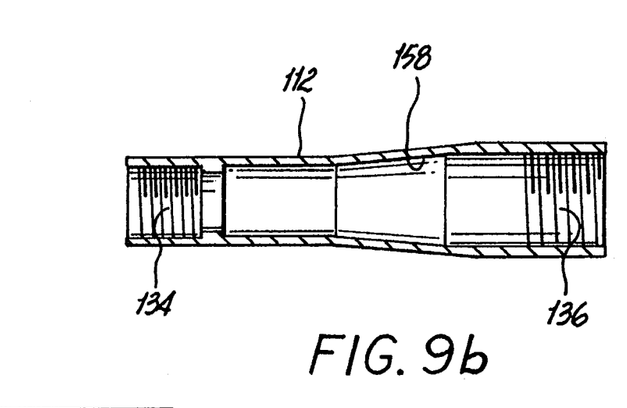
Figure 9C:
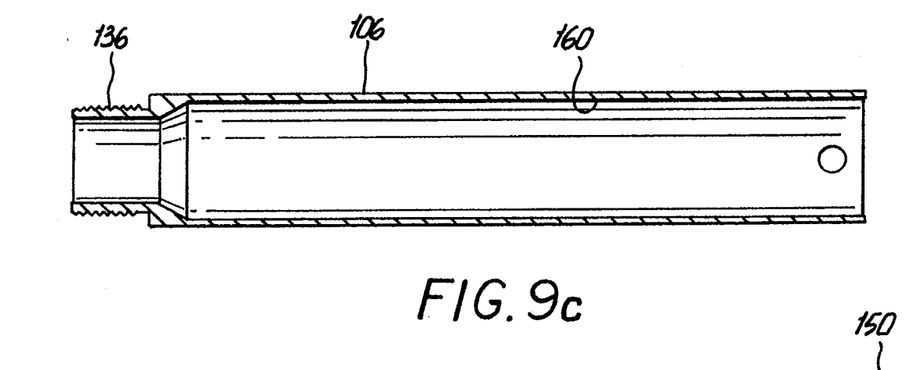
Figure 9D:
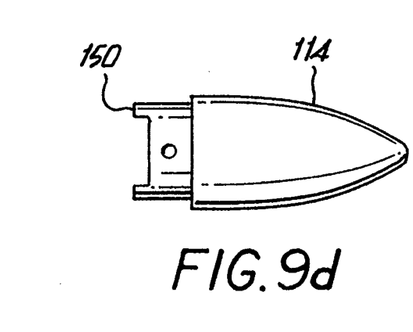

Turning now to FIGS. 9a through 9d, there is illustrated the entire barrel assembly of the pitot static tube 100 of FIG. 8. FIG. 9a illustrates the tip member 108 which includes flow opening 110 having a tapered inlet 152 which leads to heater chamber 156. Screw threads 134 removably secures tip member 108 to transition element 112 as shown in FIG. 9b. Transition element 112 includes heater chamber 158 and further includes screw threads 136 for removably securing transition element 112 to barrel portion 106. Barrel portion 106, as shown in FIG. 9c includes heater chamber 160, and includes means such as a set screw opening for releasably securing end cap member 114 to its end opposite tip member 108. As seen in FIG. 9d, end cap member 114 includes an abutment surface 150 which urges spring member 148 against the heating element assembly to secure the heating element assembly in place. It should be noted here that transition element 112 allows for variation in size of the barrel portion of the pitot tube assembly which can make assembly longer or shorter dependent upon the size of the transition element and its corresponding heater.

Figure 10A:
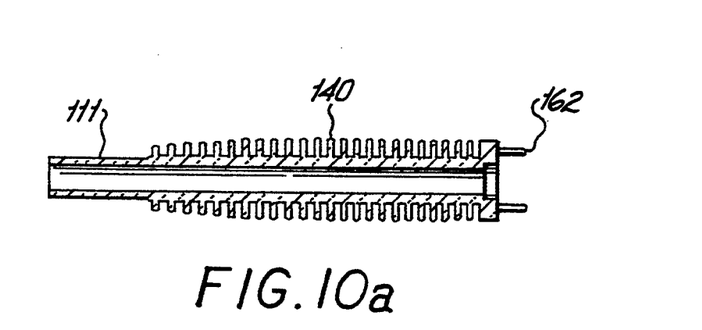
FIGS. 10a-10c illustrate the tip heater, transition element heater, and barrel heater, respectively, of the pitot static tube of FIG. 6.
Figure 10B:
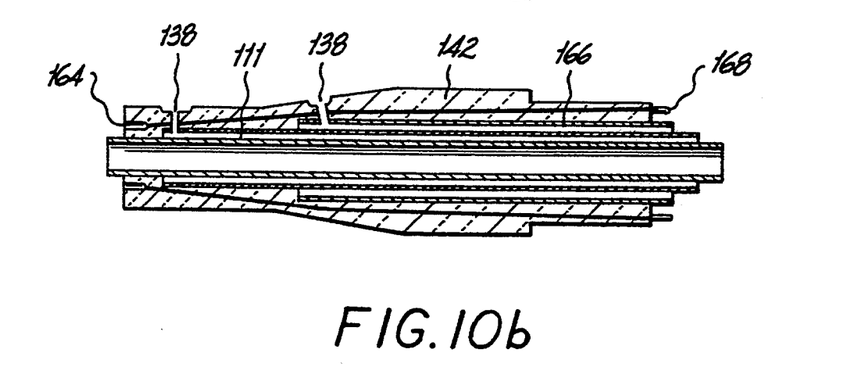
Figure 10C:
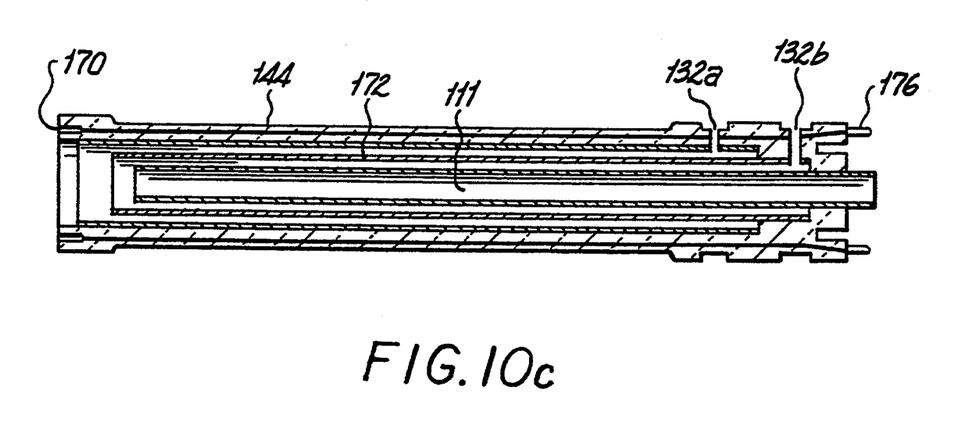

FIGS. 10a–10c illustrate the heating assembly of the pitot tube 100 of FIG. 6. FIG. 10a illustrates tip heater 140 which includes flow passage 111 and terminates in electrical connection pins 162. Pins 162 join tip heater 140 with transition heater 142 at connectors 164. Transition heater element 142 includes air passages 166 which communicate with the outside air through static ports 138. Flow passage 111 is axially aligned with flow passage 111 of tip heater 140, and transition heater element 142 connects to barrel heater 144 at pins 168 which join to connectors 170. As seen in FIG. 10c, barrel heater 144 includes air passages 172 which correspond to air passages 166 in transition heater element 142, and air passages 172 terminate at barrel openings 132a and 132b. Flow passage 111 is aligned with the flow passages of tip heater 140 and transition heater 142. Barrel heater 144 terminates in electrical connection pins 176 subsequently joined to wires for connection to the main control of the aircraft.

While the invention has been particularly shown and described with reference to the preferred embodiments, it will be understood by those skilled in the art that various modifications and changes in form and detail may be made therein without departing from the scope and spirit of the invention. Accordingly, modifications such as those suggested above, but not limited thereto, are to be considered within the scope of the invention.

What is claimed is:

1. A repairable pitot static tube including a mounting assembly for removably mounting to an aircraft, comprising:

a body portion having at least one internal chamber for communicating with an instrument panel in said aircraft through said mounting assembly;

a first heater in said body portion removably mounted in said at least one chamber of said body portion;

a barrel portion depending from said body portion and having a central passageway;

a tip member removably secured to a first end of said barrel portion and having a central passageway in axial alignment with said central passageway of said barrel portion, said tip member having an open end to allow passage of air through said central passageway;

an end cap member removably secured to a second end of said barrel portion for closing off said central passageway; and a second heater positioned in said central passageway of said barrel portion, said second heater including a hollow core forming a channel in fluid communication with said at least one chamber of said body portion and said open end of said tip member;

wherein said second heater is removably accessible from either of said first and second ends of barrel portion upon removal of either of said tip member and said end cap member.

2. A pitot static tube according to claim 1, further comprising a chamber in said body portion for housing said first heater, said chamber including a heat conductive medium.

3. A pitot static tube according to claim 2, wherein said first heater comprises an electrically insulated rod-type heater.

4. A pitot static tube according to claim 1, wherein said second heater comprises a heating element for said tip member and a heating element for said barrel portion connected in series by quick disconnect means.

5. A pitot static tube according to claim 4, wherein said tip member heating element is accessible from said first end of said barrel portion upon removal of said tip member, and said barrel portion heating element is accessible from either of said first end and said second end of said barrel portion upon removal of said end cap member.

6. A pitot static tube according to claim 1, further comprising at least one removable transition barrel component positioned between said tip member and said barrel portion.

7. A pitot static tube according to claim 6, wherein said second heater comprises a heating element substantially positioned within said tip member, a heating element connected to said tip member heating element substantially positioned within said transition barrel component, and a heating element connected to said transition heating element substantially positioned within said barrel portion.

8. A pitot static tube according to claim 1, further comprising biasing means in said barrel portion for urging said second heater towards said tip member.

9. A pitot static tube according to claim 8, wherein said biasing means comprises a spring.

10. A pitot static tube according to claim 1, wherein said body portion includes a plurality of partition members for defining a plurality of chambers, said first heater being positioned in one of said chambers along with a heat conducting medium.

11. A pilot static tube according to claim 1, wherein said first heater is mounted to and removable through said mounting assembly.

12. In a repairable pitot static tube for removable mounting to an aircraft, said pitot static tube including a mounting assembly and a body portion having at least one internal chamber and a first heater removably mounted on said body portion; the improvement which comprises:

a barrel portion depending from said body portion and having a central passageway;

a removable tip member at a first end of said barrel portion and including a central passageway in alignment with said passageway of said barrel portion, said tip member having an opening to allow passage of air through said central passageway;

a second heater positioned in said central passageway having a hollow core forming a channel in fluid communication with said at least one internal chamber of said body portion and said opening of said tip member; and an end cap member removably secured at a second end of said barrel portion;

wherein said second heater is accessible from first and second ends of said barrel portion upon removal of either of said tip member and said end cap member.

13. The improvement of claim 12, wherein said second heater comprises a tip heating element and a barrel heating element detachably connected to each other.

14. The improvement of claim 12, further comprising a transition barrel component having a central passageway detachably positioned between said tip member and said barrel portion.

15. The improvement of claim 14, wherein said second heater comprises a tip heating element, a transition heating element and a barrel heating element detachably connected to each other.

16. The improvement of claim 12, further comprising biasing means for urging said second heater towards said tip member.

17. The improvement of claim 12, wherein said second heater includes at least one additional air passageway for providing fluid communication between at least one port in said barrel portion and at least one internal chamber in said body portion.

18. A repairable pitot static tube including a mounting assembly for removably mounting to an aircraft, comprising:

a body portion having at least one internal chamber for communicating with an instrument panel in said aircraft through said mounting assembly;

a first heater in said body portion removably mounted in said at least one chamber of said body portion, said first heater being mounted to and removable through said mounting assembly;

a barrel portion depending from said body portion and having a central passageway;

a tip member removably secured to a first end of said barrel portion and having a central passageway in axial alignment with said central passageway of said barrel portion, said tip member having an open end to allow passage of air through said central passageway;

an end cap member removably secured to a second end of said barrel portion for closing off said central passageway;

a second heater positioned in said central passageway of said barrel portion, said second heater including a hollow core forming a channel in fluid communication with said at least one chamber of said body portion and said open end of said tip member; and transition means for extending the length of said barrel portion, said transition means including means for releasably securing said transition means between said barrel portion and said tip member.

19. A pitot static tube according to claim 18, wherein said second heater comprises a tip heating element, a transition heating element and a barrel heating element detachably connected to each other.

20. A pitot static tube according to claim 18, wherein said barrel portion and said tip member have a circular cross-section.

21. In a repairable pitot static tube for removable mounting to an aircraft, said pitot static tube including a mounting assembly and a body portion having at least one internal chamber for communicating with an instrument panel of said aircraft; the improvement which comprises:

- a barrel portion extending from said body portion including a first end and a second end and having a first central passageway;
- a removable tip member at the first end of said barrel portion and including a second central passageway in axial alignment with said first passageway of said barrel portion, said tip member having an open end to allow passage of air through said first and second central passageways;
- a heater positioned in at least said first central passageway having a hollow core forming a channel in fluid communication with said at least one internal chamber of said body portion and said open end of said tip member; and
- an end cap member removably secured at said second end of said barrel portion;
- wherein said heater is accessible from either of first and second ends of said barrel portion upon removal of either of said tip member and said end cap member.

* * * * *